United States Patent
Jose et al.

(10) Patent No.: US 11,659,587 B2
(45) Date of Patent: May 23, 2023

(54) METHOD AND APPARATUS FOR HANDLING OVERLAPPED TRANSMISSION OPPORTUNITIES IN MOBILE COMMUNICATIONS

(71) Applicant: MediaTek Singapore Pte. Ltd., Singapore (SG)

(72) Inventors: Pradeep Jose, Cambridge (GB); Pavan Santhana Krishna Nuggehalli, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/667,885

(22) Filed: Oct. 29, 2019

(65) Prior Publication Data
US 2020/0137768 A1  Apr. 30, 2020

Related U.S. Application Data

(60) Provisional application No. 62/799,128, filed on Jan. 31, 2019, provisional application No. 62/752,381, filed on Oct. 30, 2018.

(51) Int. Cl.
*H04W 72/10* (2009.01)
*H04W 72/56* (2023.01)
(Continued)

(52) U.S. Cl.
CPC ........... *H04W 72/56* (2023.01); *H04L 1/1887* (2013.01); *H04W 72/21* (2023.01); *H04W 72/51* (2023.01); *H04W 74/0875* (2013.01)

(58) Field of Classification Search
CPC ........... H04W 72/048; H04W 72/0413; H04W 72/10; H04W 74/0875; H04L 1/1854; H04L 1/1887
See application file for complete search history.

(56) References Cited

U.S. PATENT DOCUMENTS

2018/0098349 A1\* 4/2018 Sun ................... H04W 72/0406
2020/0045724 A1\* 2/2020 Lu ..................... H04W 72/1242
(Continued)

FOREIGN PATENT DOCUMENTS

| CN | 104662939 A | 5/2015 |
| CN | 108513735 A | 9/2018 |
| WO | WO 2018082571 A1 | 5/2018 |

OTHER PUBLICATIONS

USPTO, International Search Report and Written Opinion for PCT/US2019/058873, dated Feb. 21, 2020.
(Continued)

*Primary Examiner* — Shukri Taha
(74) *Attorney, Agent, or Firm* — Han IP PLLC; Andy M. Han (57) ABSTRACT

Various solutions for handling overlapped transmission opportunities with respect to user equipment and network apparatus in mobile communications are described. An apparatus may receive configurations allocating a first transmission opportunity and a second opportunity. The apparatus may determine whether the first transmission opportunity and the second transmission opportunity are overlapped. The apparatus may determine a priority of at least one of the first transmission opportunity and the second transmission opportunity according to a predetermined rule in an event that the first transmission opportunity and the second transmission opportunity are overlapped. The apparatus may perform a transmission according to the priority.

17 Claims, 4 Drawing Sheets

(51) Int. Cl.
*H04L 1/1867* (2023.01)
*H04W 74/08* (2009.01)
*H04W 72/21* (2023.01)
*H04W 72/51* (2023.01)

(56) References Cited

U.S. PATENT DOCUMENTS

2020/0146040 A1* 5/2020 Lee .................. H04W 72/14
2020/0305186 A1* 9/2020 Alfarhan ............ H04W 72/14
2020/0374899 A1* 11/2020 Ohta ................ H04W 72/1268

OTHER PUBLICATIONS

China National Intellectual Property Administration, First Office Action for China Patent Application No. 201980004433.5, dated Jan. 11, 2023.

* cited by examiner

METHOD AND APPARATUS FOR HANDLING OVERLAPPED TRANSMISSION OPPORTUNITIES IN MOBILE COMMUNICATIONS

CROSS REFERENCE TO RELATED PATENT APPLICATION(S)

The present disclosure claims the priority benefit of U.S. Provisional Patent Application No. 62/752,381, filed 30 Oct. 2018, and U.S. Provisional Patent Application No. 62/799,128, filed 31 Jan. 2019. The contents of aforementioned applications are herein incorporated by reference in their entirety.

TECHNICAL FIELD

The present disclosure is generally related to mobile communications and, more particularly, to handling overlapped transmission opportunities with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR) or Industrial Internet of Things (IIoT), the network node may configure two types of uplink grants for the user equipment (UE) to perform uplink transmissions. The uplink grant may indicate some specific radio resources (e.g., time and frequency resources) for the UE to perform uplink transmission. One type of the uplink grant may comprise the dynamic grant. The dynamic grant may be configured based on the UE's request. For example, the UE may transmit a prior request (e.g., service request (SR), random-access channel (RACH) request or buffer status report (BSR)) to the network. After receiving the request, the network may configure the dynamic grant according to UE's request for the UE to perform uplink data transmission.

The other type of the uplink grant may comprise the configured grant. The configured grant may be configured by the network without UE's request. The uplink transmission based on the configured grant may also be called as a grant-free transmission or a semi persistent scheduling (SPS) transmission. The uplink grant-free transmission or the SPS transmission may be used to address the requirements of specific services in wireless communications. For example, it can be used for voice over internet protocol (VoIP) services or ultra-reliable and low latency communications (URLLC) services in Long-Term Evolution (LTE) or NR. The UE may be configured to transmit its uplink data on the configured grant without transmitting a prior request to improve the transmission latency. The network may pre-configure specific radio resources (e.g., time and frequency resources) for the UE to perform the uplink SPS/grant-free/configured grant transmissions.

On the other hand, different service types with different requirements are also introduced in NR or IIoT. For example, enhanced mobile broadband (eMBB) services or URLLC services may be used depending on practical demands. Generally, eMBB services can be used for huge data transmissions and require wide bandwidth. URLLC services can be used for high reliability transmissions and require low latency. A general URLLC reliability requirement is that a packet of size 32 bytes shall be transmitted within 1 millisecond end-to-end latency with a success probability of $10^{-5}$. Thus, URLLC services require more up-to-date and reliable channel information than enhanced mobile broadband (eMBB) services. The UE needs to properly perform transmissions to meet different service requirements.

However, in some scenarios, multiple resource allocations (e.g., uplink grants) and/or different types of traffic may be configured to one UE. These resource allocations may be overlapped with each other. For example, time domain and/or frequency domain resource allocations of two uplink grants may be overlapped. When these uplink grants are available, the UE may not be able to simultaneously perform transmissions on the overlapped uplink grants. The UE may need to choose one of them to perform uplink transmission and drop/delay/puncture other uplink grants.

Accordingly, how to determine priorities of uplink grants when multiple uplink grants are overlapped with each other becomes an important issue for some specific services in the newly developed wireless communication network. Therefore, it is needed to provide proper prioritization mechanisms to handle multiple overlapped transmission opportunities.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to handling overlapped transmission opportunities with respect to user equipment and network apparatus in mobile communications.

In one aspect, a method may involve an apparatus receiving configurations allocating a first transmission opportunity and a second opportunity. The method may also involve the apparatus determining whether the first transmission opportunity and the second transmission opportunity are overlapped. The method may further involve the apparatus determining a priority of at least one of the first transmission opportunity and the second transmission opportunity according to a predetermined rule in an event that the first transmission opportunity and the second transmission opportunity are overlapped. The method may further involve the apparatus performing a transmission according to the priority.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, configurations allocating a first transmission opportunity and a second opportunity. The processor may also perform operations comprising determining whether the first transmission opportunity and the second transmission opportunity are overlapped. The processor may further perform operations comprising determining a priority of at least one of the first transmission opportunity and the second transmission opportunity according to a predetermined rule in an event that the first transmission opportunity and the second transmission opportunity are overlapped. The processor may further perform operations comprising performing, via the transceiver, a transmission according to the priority.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.
Overview Implementations in accordance with the present disclosure relate to various techniques, methods, schemes and/or solutions pertaining to handling overlapped transmission opportunities with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR or IIoT, the network node may configure different types of transmission opportunities (e.g., uplink grants) for the UE to perform uplink transmissions. The uplink grant may indicate some specific radio resources (e.g., time and/or frequency resources) for the UE to perform uplink transmission. One type of the uplink grant may comprise the dynamic grant. The dynamic grant may be configured based on the UE's request. For example, the UE may transmit a prior request (e.g., SR, RACH request or BSR) to the network. After receiving the request, the network may configure the dynamic grant according to UE's request for the UE to perform uplink data transmission.

The other type of the uplink grant may comprise the configured grant. The configured grant may be configured by the network without UE's request. The uplink transmission based on the configured grant may also be called as a grant-free transmission or an SPS transmission. The uplink grant-free transmission or the SPS transmission may be used to address the requirements of specific services in wireless communications. For example, it can be used for VoIP services or URLLC services in LTE or NR. The UE may be configured to transmit its uplink data on the configured grant without transmitting a prior request to improve the transmission latency. The network may pre-configure specific radio resources (e.g., time and/or frequency resources) for the UE to perform the uplink SPS/grant-free/configured grant transmissions.

On the other hand, different service types with different requirements are also introduced in NR or IIoT. For example, eMBB services or URLLC services may be used depending on practical demands. Generally, eMBB services can be used for huge data transmissions and require wide bandwidth. URLLC services can be used for high reliability transmissions and require low latency. A general URLLC reliability requirement is that a packet of size 32 bytes shall be transmitted within 1 millisecond end-to-end latency with a success probability of $10^{-5}$. Thus, URLLC services require more up-to-date and reliable channel information than enhanced mobile broadband (eMBB) services. The UE needs to properly perform transmissions to meet different service requirements.

However, in some scenarios, multiple resource allocations (e.g., uplink grants) and/or different types of traffic may be configured to one UE. These resource allocations may be overlapped with each other. For example, time domain and/or frequency domain resource allocations of two uplink grants may be overlapped. When these uplink grants are available, the UE may not be able to simultaneously perform transmissions on the overlapped uplink grants. The UE may need to choose one of them to perform uplink transmission and drop/delay/puncture other uplink grants. Accordingly, some prioritization mechanisms among overlapped uplink grants are needed.

In view of the above, the present disclosure proposes a number of schemes pertaining to handling overlapped transmission opportunities with respect to the UE and the network apparatus. According to the schemes of the present disclosure, some rules can be defined to determine priority of an uplink grant. When multiple overlapping uplink grants are provided, these rules can be used to prioritize the uplink grants. These rules may also be used when multiple uplink grants share the same priority as a result of other prioritisation mechanisms. Accordingly, the UE is able to resolve the conflict between overlapped uplink grants. The UE may also be able to properly perform uplink transmissions for different types of traffic to meet service requirements.

Specifically, the UE may be configured to receiver a configuration allocating a transmission opportunity from the network node. The transmission opportunity may comprise an uplink grant. In some scenarios, the UE may receive a plurality of transmission opportunities from the network node. For example, the UE may receive the configurations allocating a first transmission opportunity and a second opportunity. When two transmission opportunities are allocated, the UE may be configured to determine whether the first transmission opportunity and the second transmission opportunity are overlapped. When multiple transmission opportunities are available, the UE may not be able to perform transmissions simultaneously on these transmission opportunities. Therefore, in an event that the first transmission opportunity and the second transmission opportunity are overlapped, the UE may be configured to determine a priority of at least one of the first transmission opportunity and the second transmission opportunity according to a predetermined rule. Then, the UE may be able to perform a transmission according to the priority. The UE may also drop, delay or puncture a transmission opportunity according to the priority of the transmission opportunity.

The transmission opportunity may comprise an uplink grant such as a configured grant or a dynamic grant. The predetermined rule may comprise determining that the second transmission opportunity comprises a higher priority than the first transmission opportunity in an event that the first transmission opportunity is allocated earlier than the second transmission opportunity. For example, in an event that multiple overlapping uplink grants are dynamically signalled by the network node, the latest signalled grant may be prioritised over the earlier signalled grant. The UE may be configured to perform the uplink transmission on the uplink grant with higher priority firstly. The UE may drop/delay/puncture the uplink transmission on the uplink grant with lower priority.

In some implementations, the predetermined rule may comprise determining that the dynamic grant comprises a higher priority than the configured grant in an event that the dynamic grant is overlapped with the configured grant. In an event that the dynamic grant overlaps with the configured grant of equal priority, the dynamic grant may be prioritised over the configured grant. The UE may be configured to perform the uplink transmission on the dynamic grant firstly.

In some implementations, the predetermined rule may comprise determining that a larger grant comprises a higher priority in an event that two configured grants are overlapped. In an event that multiple overlapping grants are configured grants, the larger grant may be prioritised. The UE may be configured to perform the uplink transmission on the larger grant firstly.

In some implementations, the predetermined rule may comprise determining that a specified grant comprises a higher priority in an event that two configured grants are overlapped. In an event that multiple overlapping grants are configured grants, a specified grant is prioritised. The specified grant may be indicated by the network node or determined by the UE. The UE may be configured to perform the uplink transmission on the specified grant firstly.

Normally, the UE may be configured with a plurality of logical channels (LCHs). Each LCH may associate with a priority based on the data it carries. Uplink transmission opportunities (e.g., uplink grants) may be used by a limited set of LCHs based on their characteristics. For example, an uplink grant that is for a short duration may be used by the LCHs carrying low latency data. Alternatively, an uplink grant that is for a long duration may not be used by low latency LCHs. Alternatively, pre-configured uplink grants may be used by low latency LCHs to avoid scheduling delays. LCH restrictions, that limit the type of uplink grants on which an LCH can be transmitted on, may be pre-configured. The set of LCHs that can be transmitted using an uplink grant, after LCH restrictions are applied, may have their data multiplexed into an uplink transport block (TB) according to a logical channel prioritisation (LCP) procedure. The UE may be configured to determine a priority of an uplink grant according to the priority of the LCHs. Accordingly, the predetermined rule may comprise an LCH prioritization.

Figure 1:
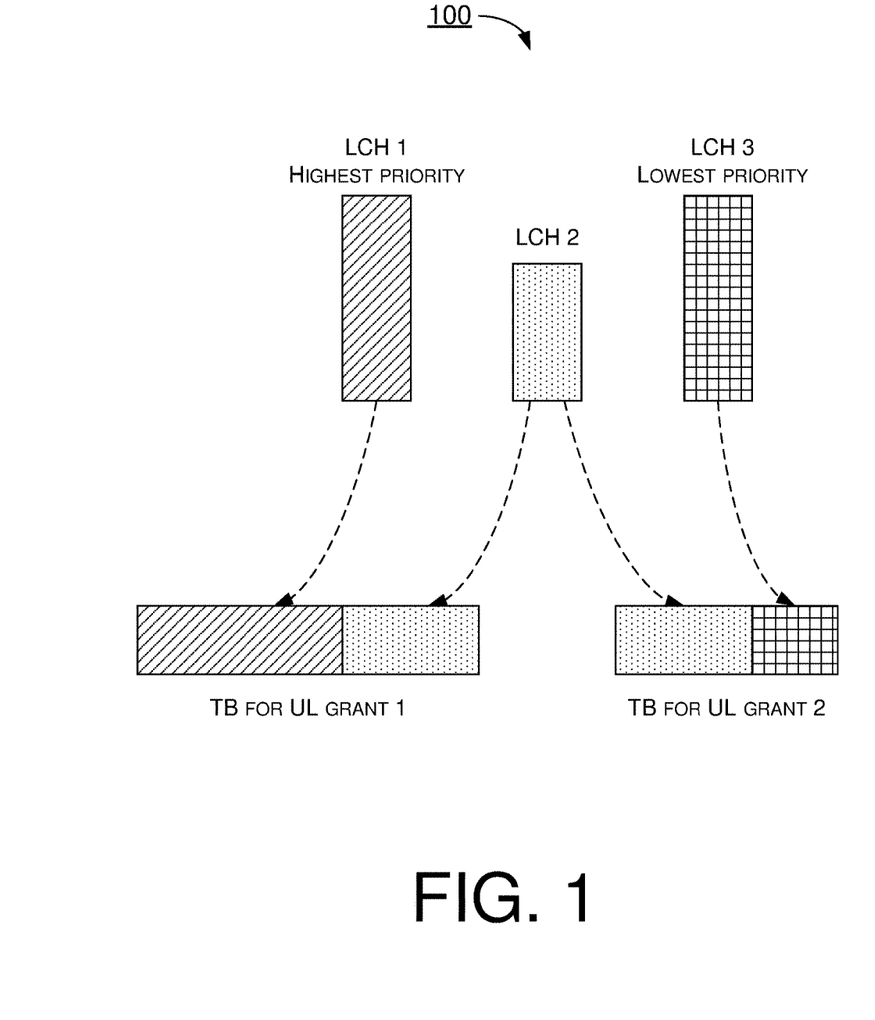
FIG. 1 is a diagram depicting an example scenario under schemes in accordance with implementations of the present disclosure.

In some implementations, the predetermined rule may comprise determining that the first transmission opportunity comprises a higher priority than the second transmission opportunity in an event that the first transmission opportunity carries a higher priority LCH than the second transmission opportunity. FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The UE may comprise a first LCH with a highest priority (e.g., LCH 1), a second LCH (e.g., LCH 2) and a third LCH with a lowest priority (e.g., LCH 3). To perform uplink transmission, the UE may be configured to multiplex the data from the LCHs into the TBs according to the priorities of the LCHs. In view of the LCP, the UE may determine the highest priority LCH to be carried in the TB. When the UE is configured with multiple uplink grants, the uplink grants may be prioritised based on the highest priority LCH carried in the corresponding TBs. For example, in scenario 100, the highest priority LCH in uplink (UL) grant 1 is LCH 1. The highest priority LCH in uplink grant 2 is LCH 2. The UE may be configured to determine that uplink grant 1 comprises a higher priority than uplink grant 2 since the TB for uplink grant 1 comprises a higher priority LCH. Accordingly, in an event that two uplink grants are configured and the first uplink grant carries a higher priority LCH than the second uplink grant, then the first uplink grant may be prioritised over the second uplink grant.

Figure 2:
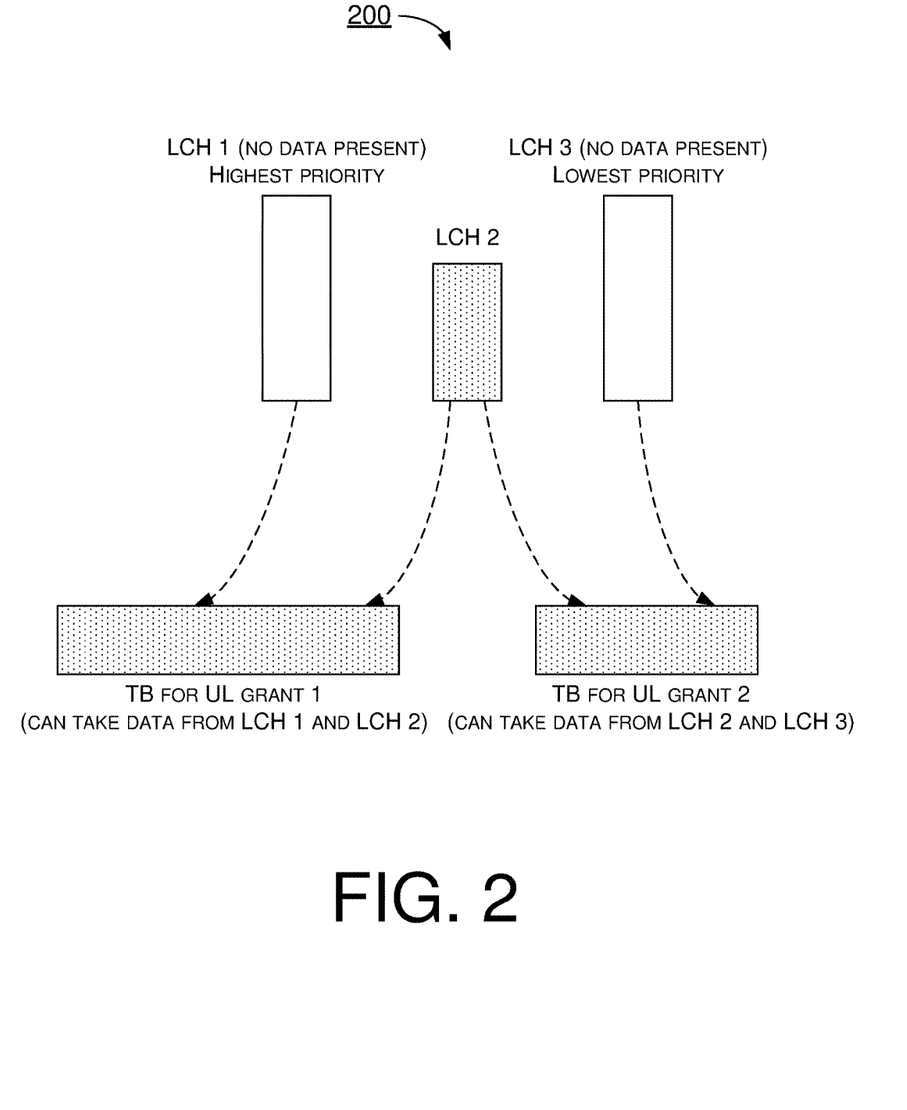
FIG. 2 is a diagram depicting an example scenario under schemes in accordance with implementations of the present disclosure.

In some implementations, the predetermined rule may comprise determining that the first transmission opportunity comprises a higher priority than the second transmission opportunity in an event that the first transmission opportunity can carry a higher priority LCH than the second transmission opportunity. FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The first LCH (e.g., LCH 1) comprises a highest priority, and no data is present. The second LCH (e.g., LCH 2) comprises data to be transmitted. The third LCH (e.g., LCH 3) comprises a lowest priority, and no data is present. In view of the LCH restrictions, the UE may determine the highest priority LCH that can be carried by an uplink grant. When the UE is configured with multiple uplink grants, an uplink grant can be prioritised based on the highest priority LCH that can be carried by the uplink grant. As this information is known at the UE even prior to LCP, UE computational requirements may be lower with this mechanism. For example, in scenario 200, the highest priority LCH that can be carried in uplink grant 1 is LCH 1. The highest priority LCH that can be carried in uplink grant 2 is LCH 2. The UE may be configured to determine that uplink grant 1 comprises a higher priority than uplink grant 2, even though both TBs carry data of equal priority, since uplink grant 1 can accommodate a higher priority LCH. Accordingly, in an event that two uplink grants are configured and LCH restrictions are such that uplink grant 1 can carry a higher priority LCH than uplink grant 2, then uplink grant 1 can be prioritised over uplink grant 2.

In some implementations, the priority of the uplink grant may be indicated by the network node. The predetermined rule may comprise priority information of at least one of the first transmission opportunity and the second transmission opportunity received from the network node. The priority information may be included in the control information that schedules at least one of the first transmission opportunity and the second transmission opportunity. The priority information may also be included in the configuration that configures at least one of the first transmission opportunity and the second transmission opportunity. For example, the downlink control information (DCI) that schedules the uplink grant may carry priority information corresponding to the uplink grant. Similarly, configured grants may have an associated priority signalled either by DCI or by radio resource control (RRC) signalling. For example, the RRC configuration of configured grant may include a priority for each configuration. The RRC configuration of a Type 1 configured grant may include a priority for the Type 1 configured grant. The DCI configuration of a Type 2 configured grant may include a priority for the Type 2 configured grant. The configured grants with a higher associated priority than the priority of the scheduled dynamic grant may be allowed to pre-empt the dynamic grant.

In view of the priority determination mechanisms as described above, in an event that multiple transmission opportunities comprise an equal priority, some rules may be further defined to prioritize at least one of the transmission opportunities. In some implementations, the larger transmission may be prioritised over the smaller transmissions. For example, the UE may be configured to prioritize a transmission opportunity that carries most data in an event that the first transmission opportunity and the second transmission opportunity are determined to comprise an equal priority.

In some implementations, the transmission carrying more data from the contained highest priority LCH may be prioritised. For example, the UE may be configured to prioritize a transmission opportunity that carries more data from a highest priority LCH in an event that the first transmission opportunity and the second transmission opportunity are determined to comprise an equal priority.

In some implementations, in an event that the transmission carries or can carry the same highest priority LCH, the UE may be configured to compare the next highest priority LCH carried or can be carried in the uplink grant. Such comparison may be proceeded sequentially till all logical channels carried or can be carried by the transmission are compared.

In some implementations, a first transmission may be prioritised without carrying out a pre-emption. For example, the UE may be configured to prioritize a transmission opportunity that starts first in an event that the first transmission opportunity and the second transmission opportunity are determined to comprise an equal priority.

In some implementations, the latest dynamically signalled uplink grant may be prioritised over other dynamic or configured uplink grants. For example, the UE may be configured to prioritize the dynamic grant in an event that the configured grant and the dynamic grant are determined to comprise an equal priority.

The various prioritisation mechanisms mentioned above may also be applied to control data corresponding to the LCHs. For example, a scheduling request (SR), hybrid automatic repeat request (HARQ) feedback or random-access channel (RACH) preamble for a higher priority LCH may be assumed to comprise a higher priority than an uplink grant that carries a lower priority LCH. Alternatively, an SR, HARQ feedback or RACH preamble for a higher priority LCH may be assumed to comprise a higher priority than an uplink grant that can only carry lower priority LCHs. Alternatively, an SR, HARQ feedback or RACH preamble for a low priority LCH may be assumed to comprise a lower priority than an uplink grant that carries a high priority LCH. Alternatively, an SR, HARQ feedback or RACH preamble for a low priority LCH may be assumed to comprise a lower priority than an uplink grant that can carry higher priority LCHs.

The priority of a transmission that includes both data and control information such as SR or HARQ feedback may be determined taking into account the priority of the data that is included or can be included in the TB, as well as the priority of the LCH that triggered the SR and the priority of the downlink transmission to which the HARQ feedback corresponds. For example, the predetermined rule may comprise determining the priority according to priority information of the LCH triggering an SR or RACH preamble transmission. The predetermined rule may also comprise determining the priority according to priority information included in the DCI scheduling a downlink transmission to which a HARQ feedback corresponds.

In some implementations, an SR may be multiplexed onto an uplink grant. Similar to HARQ and CSI multiplexing on physical uplink shared channel (PUSCH), SR bits may be multiplexed with data on the uplink TB. A new medium access control (MAC) control element (CE) may be defined for the SR which is multiplexed onto the uplink TB.

The priority of an SR may be configured per LCH associated with the SR, per set of LCHs mapped to the SR, or per SR configuration. A high priority SR may override an SR prohibit timer. A CSI report may be always determined to be of a low priority. A priority of the HARQ feedback may correspond to the priority indicated within the DCI that scheduled the data transmission. In addition, a high priority SR may pre-empt a HARQ feedback except for that the SR may be multiplexed with the HARQ. A high priority SR may pre-empt a CSI report except for that the SR may be multiplexed with the CSI report.

Illustrative Implementations

Figure 3:
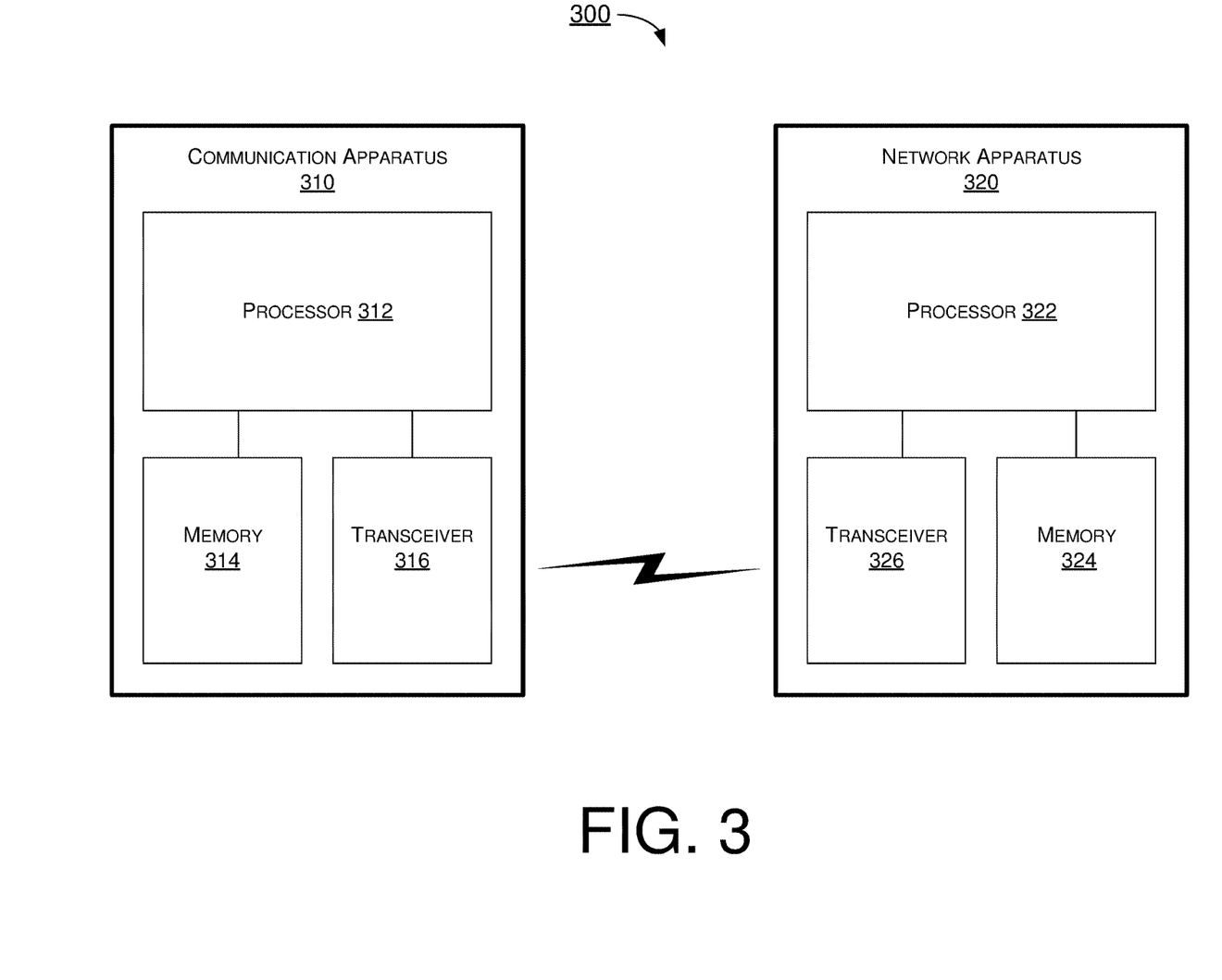
FIG. 3 is a block diagram of an example communication apparatus and an example network apparatus in accordance with an implementation of the present disclosure.
Figure 4:
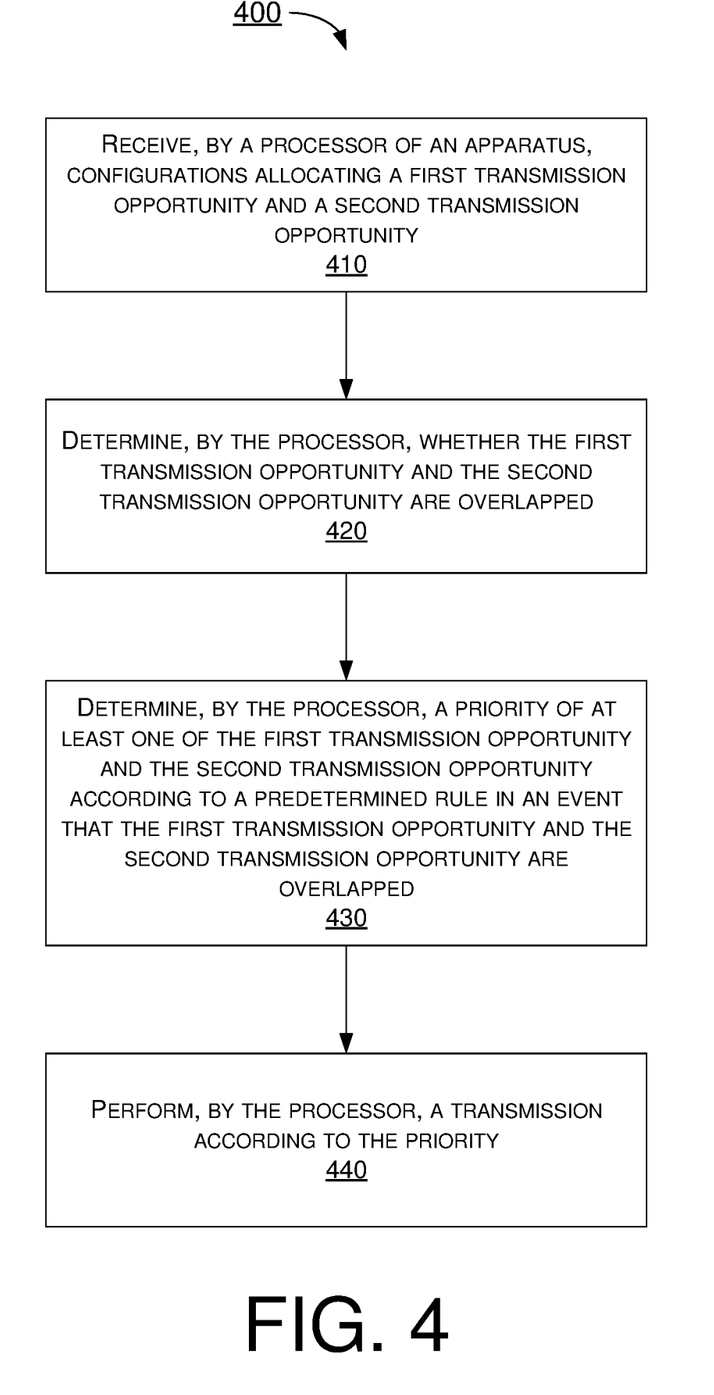
FIG. 4 is a flowchart of an example process in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to handling overlapped transmission opportunities with respect to user equipment and network apparatus in wireless communications, including scenarios/mechanisms described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to receiver, via transceiver 316, a configuration allocating a transmission opportunity from network apparatus 320. The transmission opportunity may comprise an uplink grant. Processor 312 may receive a plurality of transmission opportunities from network apparatus 320. For example, processor 312 may receive the configurations allocating a first transmission opportunity and a second opportunity. When two transmission opportunities are allocated, processor 312 may be configured to determine whether the first transmission opportunity and the second transmission opportunity are overlapped. In an event that the first transmission opportunity and the second transmission opportunity are overlapped, processor 312 may be configured to determine a priority of at least one of the first transmission opportunity and the second transmission opportunity according to a predetermined rule. Then, processor 312 may be able to perform, via transceiver 316, a transmission according to the priority. Processor 312 may also drop, delay or puncture a transmission opportunity according to the priority of the transmission opportunity.

In some implementations, processor 312 may determine that the second transmission opportunity comprises a higher priority than the first transmission opportunity in an event that the first transmission opportunity is allocated earlier than the second transmission opportunity. For example, in an event that multiple overlapping uplink grants are dynamically signalled by network apparatus 320, processor 312 may prioritize the latest signalled grant over the earlier signalled grant. Processor 312 may be configured to perform, via transceiver 316, the uplink transmission on the uplink grant with higher priority firstly. Processor 312 may drop/delay/puncture the uplink transmission on the uplink grant with lower priority.

In some implementations, processor 312 may determine that the dynamic grant comprises a higher priority than the configured grant in an event that the dynamic grant is overlapped with the configured grant. In an event that the dynamic grant overlaps with the configured grant of equal priority, processor 312 may prioritize the dynamic grant over the configured grant. Processor 312 may be configured to perform, via transceiver 316, the uplink transmission on the dynamic grant firstly.

In some implementations, processor 312 may determine that a larger grant comprises a higher priority in an event that two configured grants are overlapped. In an event that multiple overlapping grants are configured grants, processor 312 may prioritize the larger grant. Processor 312 may be configured to perform, via transceiver 316, the uplink transmission on the larger grant firstly.

In some implementations, processor 312 may determine that a specified grant comprises a higher priority in an event that two configured grants are overlapped. In an event that multiple overlapping grants are configured grants, processor 312 may prioritize a specified grant. The specified grant may be indicated by network apparatus 320 or determined by processor 312. Processor 312 may be configured to perform, via transceiver 316, the uplink transmission on the specified grant firstly.

In some implementations, processor 312 may be configured with a plurality of LCHs. Processor 312 may be configured to determine a priority of an uplink grant according to the priority of the LCHs.

In some implementations, processor 312 may determine that the first transmission opportunity comprises a higher priority than the second transmission opportunity in an event that the first transmission opportunity carries a higher priority LCH than the second transmission opportunity. To perform uplink transmission, processor 312 may be configured to multiplex the data from the LCHs into the TBs according to the priorities of the LCHs. In view of the LCP, processor 312 may determine the highest priority LCH to be carried in the TB. When processor 312 is configured with multiple uplink grants, processor 312 may prioritize the uplink grants based on the highest priority LCH carried in the corresponding TBs. In an event that two uplink grants are configured and the first uplink grant carries a higher priority LCH than the second uplink grant, processor 312 may prioritize the first uplink grant over the second uplink grant.

In some implementations, processor 312 may determine that the first transmission opportunity comprises a higher priority than the second transmission opportunity in an event that the first transmission opportunity can carry a higher priority LCH than the second transmission opportunity. In view of the LCH restrictions, processor 312 may determine the highest priority LCH that can be carried by an uplink grant. When processor 312 is configured with multiple uplink grants, processor 312 may prioritize an uplink grant based on the highest priority LCH that can be carried by the uplink grant. In an event that two uplink grants are configured and LCH restrictions are such that a first uplink grant can carry a higher priority LCH than a second uplink grant, processor 312 may prioritize the first uplink grant over the second uplink grant.

In some implementations, the priority of the uplink grant may be indicated by network apparatus 320. Processor 322 may include the priority information in the control information that schedules at least one of the first transmission opportunity and the second transmission opportunity. Processor 322 may also include the priority information in the configuration that configures at least one of the first transmission opportunity and the second transmission opportunity. For example, processor 322 may use the DCI that schedules the uplink grant to carry priority information corresponding to the uplink grant. Similarly, configured grants may have an associated priority signalled either by DCI or by radio resource control (RRC) signalling. For example, processor 322 may include a priority for each configuration in the RRC configuration of configured grant. Processor 322 may include a priority for a Type 1 configured grant in the RRC configuration of the Type 1 configured grant. Processor 322 may include a priority for a Type 2 configured grant in the DCI configuration of the Type 2 configured grant.

In some implementations, processor 312 may prioritize the larger transmission over the smaller transmissions. For example, processor 312 may be configured to prioritize a transmission opportunity that carries most data in an event that the first transmission opportunity and the second transmission opportunity are determined to comprise an equal priority.

In some implementations, processor 312 may prioritize the transmission carrying more data from the contained highest priority LCH. For example, processor 312 may be configured to prioritize a transmission opportunity that carries more data from a highest priority LCH in an event that the first transmission opportunity and the second transmission opportunity are determined to comprise an equal priority.

In some implementations, in an event that the transmission carries or can carry the same highest priority LCH, processor 312 may be configured to compare the next highest priority LCH carried or can be carried in the uplink grant. Processor 312 may proceed such comparison sequentially till all logical channels carried or can be carried by the transmission are compared.

In some implementations, processor 312 may prioritize a first transmission without carrying out a pre-emption. For example, processor 312 may be configured to prioritize a transmission opportunity that starts first in an event that the first transmission opportunity and the second transmission opportunity are determined to comprise an equal priority.

In some implementations, processor 312 may prioritize the latest dynamically signalled uplink grant over other dynamic or configured uplink grants. For example, processor 312 may prioritize may be configured to prioritize the dynamic grant in an event that the configured grant and the dynamic grant are determined to comprise an equal priority.

Illustrative Processes

FIG. 4 illustrates an example process 400 in accordance with an implementation of the present disclosure. Process 400 may be an example implementation of above scenarios/schemes, whether partially or completely, with respect to handling overlapped transmission opportunities with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 receiving configurations allocating a first transmission opportunity and a second opportunity. Process 400 may proceed from 410 to 420.

At 420, process 400 may involve processor 312 determining whether the first transmission opportunity and the second transmission opportunity are overlapped. Process 400 may proceed from 420 to 430.

At 430, process 400 may involve processor 312 determining a priority of at least one of the first transmission opportunity and the second transmission opportunity according to a predetermined rule in an event that the first transmission opportunity and the second transmission opportunity are overlapped. Process 400 may proceed from 430 to 440.

At 440, process 400 may involve processor 312 performing a transmission according to the priority.

In some implementations, at least one of the first transmission opportunity and the second transmission opportunity may comprise a configured grant or a dynamic grant.

In some implementations, process 400 may involve processor 312 determining that the second transmission opportunity comprises a higher priority than the first transmission opportunity in an event that the first transmission opportunity is allocated earlier than the second transmission opportunity.

In some implementations, process 400 may involve processor 312 determining that the dynamic grant comprises a higher priority than the configured grant in an event that the dynamic grant is overlapped with the configured grant.

In some implementations, process 400 may involve processor 312 determining that a larger grant comprises a higher priority in an event that two configured grants are overlapped.

In some implementations, process 400 may involve processor 312 determining that a specified grant comprises a higher priority in an event that two configured grants are overlapped.

In some implementations, process 400 may involve processor 312 determining the priority according to an LCH prioritization.

In some implementations, process 400 may involve processor 312 determining that the first transmission opportunity comprises a higher priority than the second transmission opportunity in an event that the first transmission opportunity carries a higher priority LCH than the second transmission opportunity.

In some implementations, process 400 may involve processor 312 determining that the first transmission opportunity comprises a higher priority than the second transmission opportunity in an event that the first transmission opportunity can carry a higher priority LCH than the second transmission opportunity.

In some implementations, process 400 may involve processor 312 determining the priority according to priority information of at least one of the first transmission opportunity and the second transmission opportunity received from a network node.

In some implementations, process 400 may involve processor 312 determining the priority according to priority information of an LCH triggering an SR or RACH preamble transmission.

In some implementations, process 400 may involve processor 312 determining the priority according to priority information included in DCI scheduling a downlink transmission to which a HARQ feedback corresponds.

In some implementations, process 400 may involve processor 312 prioritizing a transmission opportunity that carries most data in an event that the first transmission opportunity and the second transmission opportunity are determined to comprise an equal priority.

In some implementations, process 400 may involve processor 312 prioritizing a transmission opportunity that carries more data from a highest priority LCH in an event that the first transmission opportunity and the second transmission opportunity are determined to comprise an equal priority.

In some implementations, process 400 may involve processor 312 prioritizing a transmission opportunity that starts first in an event that the first transmission opportunity and the second transmission opportunity are determined to comprise an equal priority.

In some implementations, process 400 may involve processor 312 prioritizing, by the processor, the dynamic grant in an event that the configured grant and the dynamic grant are determined to comprise an equal priority.

In some implementations, the priority information may be included in control information that schedules at least one of the first transmission opportunity and the second transmission opportunity.

In some implementations, the priority information may be included in the configurations.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, configurations allocating a first transmission opportunity and a second opportunity;
   determining, by the processor, whether the first transmission opportunity and the second transmission opportunity are overlapped;
   determining, by the processor and responsive to the first transmission opportunity and the second transmission opportunity being overlapped, a priority of at least one of the first transmission opportunity and the second transmission opportunity; and
   performing, by the processor, a transmission using one of the first transmission opportunity and the second transmission opportunity that bears a higher priority of the determined priorities of the overlapped first and second transmission opportunities,
   wherein the determining comprises, responsive to data carried or data that can be carried in the first transmission opportunity having a higher priority than data carried or data that can be carried in the second transmission opportunity, prioritizing the first transmission opportunity over the second transmission opportunity.

2. The method of claim 1, wherein at least one of the first transmission opportunity and the second transmission opportunity comprises a configured grant or a dynamic grant.

3. The method of claim 1, wherein the determining of the priority of the at least one of the first transmission opportunity and the second transmission opportunity comprises determining that the second transmission opportunity comprises a higher priority than the first transmission opportunity in an event that the first transmission opportunity is allocated earlier than the second transmission opportunity.

4. The method of claim 2, wherein the determining of the priority of the at least one of the first transmission opportunity and the second transmission opportunity comprises determining that the dynamic grant comprises a higher priority than the configured grant in an event that the dynamic grant is overlapped with the configured grant.

5. The method of claim 2, wherein the determining of the priority of the at least one of the first transmission opportunity and the second transmission opportunity comprises determining that a larger grant comprises a higher priority in an event that two configured grants are overlapped.

6. The method of claim 2, wherein the determining of the priority of the at least one of the first transmission opportunity and the second transmission opportunity comprises determining that a specified grant comprises a higher priority in an event that two configured grants are overlapped.

7. The method of claim 1, wherein the determining of the priority of the at least one of the first transmission opportunity and the second transmission opportunity comprises determining based on priority information of at least one of the first transmission opportunity and the second transmission opportunity received from a network node.

8. The method of claim 1, wherein the determining of the priority of the at least one of the first transmission opportunity and the second transmission opportunity comprises determining the priority according to priority information of a LCH triggering a scheduling request (SR) or random access channel (RACH) preamble transmission.

9. The method of claim 1, wherein the determining of the priority of the at least one of the first transmission opportunity and the second transmission opportunity comprises determining the priority according to priority information included in downlink control information scheduling a downlink transmission to which a hybrid automatic repeat request (HARQ) feedback corresponds.

10. The method of claim 1, further comprising:
    prioritizing, by the processor, a transmission opportunity that carries most data in an event that the first transmission opportunity and the second transmission opportunity are determined to comprise an equal priority.

11. The method of claim 1, further comprising:
    prioritizing, by the processor, a transmission opportunity that carries more data from a highest priority LCH in an event that the first transmission opportunity and the second transmission opportunity are determined to comprise an equal priority.

12. The method of claim 1, further comprising:
prioritizing, by the processor, a transmission opportunity that starts first in an event that the first transmission opportunity and the second transmission opportunity are determined to comprise an equal priority.

13. The method of claim 2, further comprising:
prioritizing, by the processor, the dynamic grant in an event that the configured grant and the dynamic grant are determined to comprise an equal priority.

14. The method of claim 7, wherein the priority information is included in control information that schedules at least one of the first transmission opportunity and the second transmission opportunity.

15. The method of claim 7, wherein the priority information is included in the configurations.

16. An apparatus, comprising:
a transceiver which, during operation, wirelessly communicates with a network node of a wireless network; and
a processor communicatively coupled to the transceiver such that, during operation, the processor performs operations comprising:
receiving, via the transceiver, configurations allocating a first transmission opportunity and a second opportunity;
determining whether the first transmission opportunity and the second transmission opportunity are overlapped;
determining, responsive to the first transmission opportunity and the second transmission opportunity being overlapped, a priority of at least one of the first transmission opportunity and the second transmission opportunity; and
performing, via the transceiver, a transmission using one of the first transmission opportunity and the second transmission opportunity that bears a higher priority of the determined priorities of the overlapped first and second transmission opportunities,
wherein the determining comprises, responsive to data carried or data that can be carried in the first transmission opportunity having a higher priority than data carried or data that can be carried in the second transmission opportunity, prioritizing the first transmission opportunity over the second transmission opportunity.

17. The apparatus of claim 16, wherein at least one of the first transmission opportunity and the second transmission opportunity comprises a configured grant or a dynamic grant.

\* \* \* \* \*